July 21, 1953 — H. F. RICE — 2,646,318
SHORT FULCRUM FOR WEIGHING SCALE LEVERS
Filed May 16, 1949

INVENTOR.
Homer F. Rice
BY Chas. Denegre
Attorney.

Patented July 21, 1953

2,646,318

UNITED STATES PATENT OFFICE 2,646,318

SHORT FULCRUM FOR WEIGHING SCALE LEVERS

Homer F. Rice, Birmingham, Ala.

Application May 16, 1949, Serial No. 93,580

2 Claims. (Cl. 308—2)

This invention relates to a short fulcrum for weighing scale lever. It has for its main objects to provide such a fulcrum that will be highly efficient, simple in structure, comparatively cheap to manufacture, and extremely durable.

Further objects are to provide a short fulcrum that will also maintain range to the desired amount; will have full strength with less than half of the usual heft material; require much lighter connections and extension levers for other parts of scale; and made any size of heft desired for any capacity or type of weighing scale.

Other objects and advantages will appear from the drawings and description.

Figure 6:
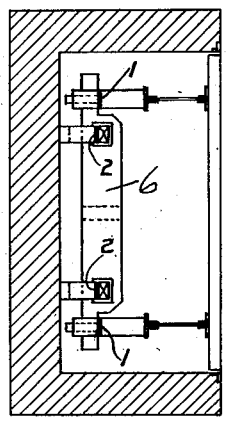
Figure 5:
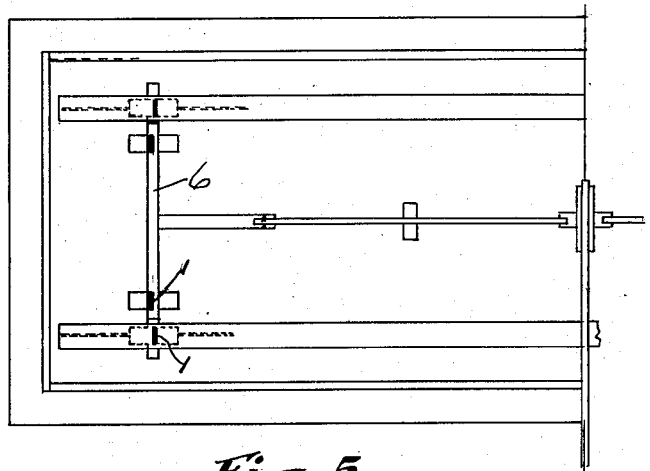
Figure 1:
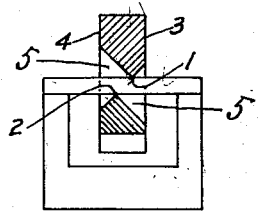
Figure 4:
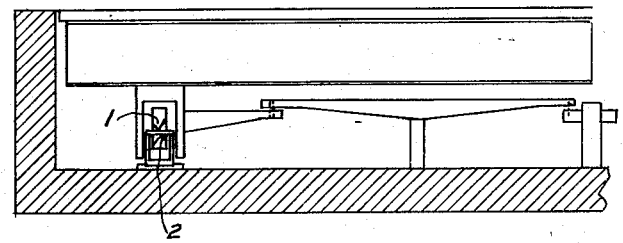
Figure 2:
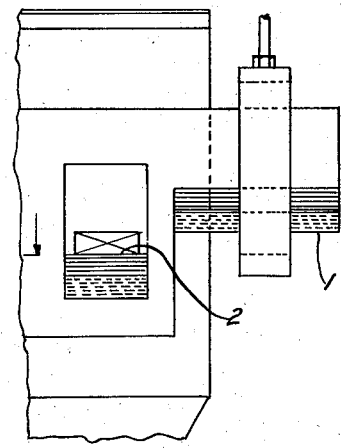
Figure 3:
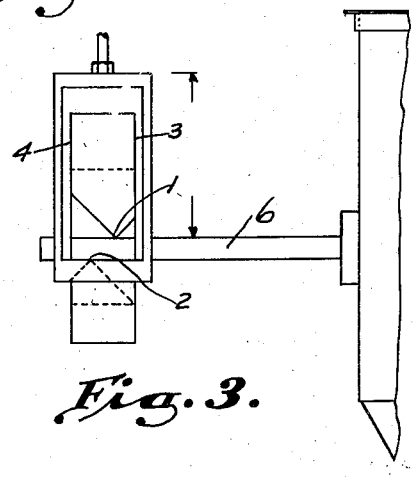

By referring generally to the drawings, part of this application, it will be observed that Fig. 1 is a detail view plainly showing the knife edges formed in a slot in a piece of metal; Fig. 2 is an enlarged detail view; Fig. 3 is an end view of Fig. 2; Fig. 4 is a sectional view of part of a scale showing how the short fulcrum works; Fig. 5 is a plan view of Fig. 4; and Fig. 6 is an end view of Fig. 5.

Similar reference numerals refer to similar parts throughout the several views.

Referring to the drawings in detail it will be seen that the dominating feature of the present invention comprises the fulcrum pointed edges 1 and 2 formed in a slot 5 in a piece of metal in opposite portions 3 and 4 thereof. The supporting lever 6 of a scale is inserted through the slot and makes contact with the knife edges 1 and 2 as indicated in all the figures to thus show short fulcrums or in other words fulcrums near each other, one being the lower end the other being the upper. The scale levers are of different shapes depending on the kinds of scales. Several kinds of levers are shown.

The fulcrums and levers therefor may be made of any material suitable for the purpose, but I prefer to use high grade steel and other metals used in the manufacture of weighing scales. Also the parts may be made in various sizes and capacities.

While I have shown and described the preferred embodiment of my invention, I do not wish to limit same to the exact and precise details of structure, but reserve the right to make all changes and modifications so long as they remain within the spirit and scope of the invention and the following claims.

Having described my invention I claim:

1. In a weighing scale lever fulcrum of the character described comprising; a metal member as part of a scale, said member having a slot therein, one edge of the slot being the upper edge and the opposite edge being the lower edge, the upper edge portion of the slot defining a pointed edge as a lever fulcrum and the lower edge portion of the slot defining a pointed edge as a lever fulcrum, said pointed edges being parallel with each other and with the sides of the said metal member, said edges being spaced apart within the opposite sides of the slot.

2. A weighing scale lever fulcrum comprising, a piece of flat metal, said piece having an elongated slot formed therein, the long side edges of the slot terminating as knife-edges, said knife-edges being spaced apart and parallel with each other.

HOMER F. RICE.

References Cited in the file of this patent

UNITED STATES PATENTS

| Number | Name | Date |
|---|---|---|
| 208,444 | Ward | Sept. 24, 1878 |
| 1,213,295 | Strubler | Jan. 23, 1917 |
| 1,527,025 | Brugmann | Feb. 17, 1925 |
| 1,764,649 | Schaper | June 17, 1930 |
| 2,063,712 | Von Pein | Dec. 8, 1936 |
| 2,322,292 | Harrison | June 22, 1943 |